Figure 1:
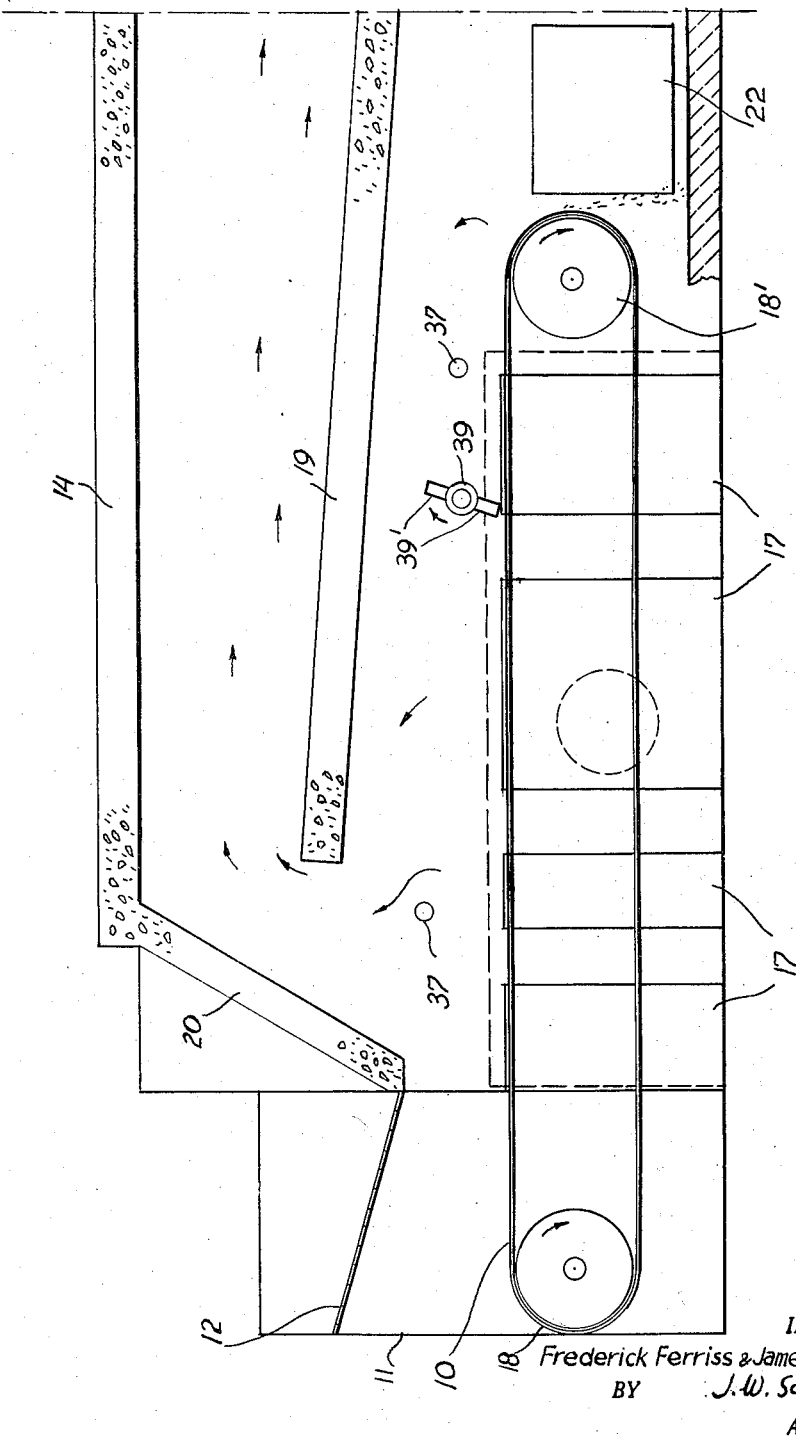

March 31, 1959  F. FERRISS ET AL  2,879,726
GARBAGE, TRASH AND SLUDGE DISPOSAL
Filed Nov. 4, 1955  4 Sheets-Sheet 1

INVENTOR.
Frederick Ferriss & James R. Gainfort
BY  J.W. Schmied
ATTORNEY

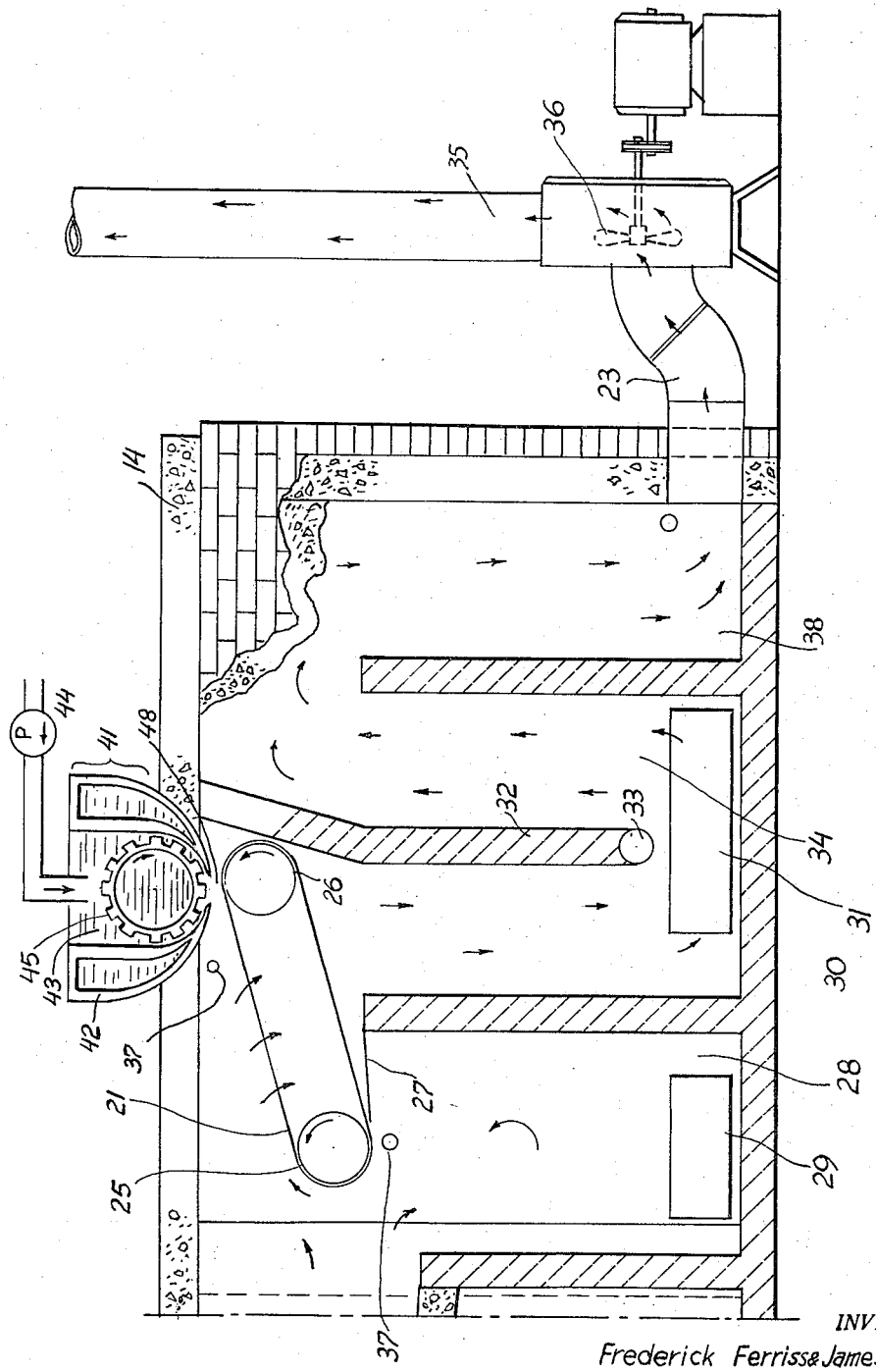

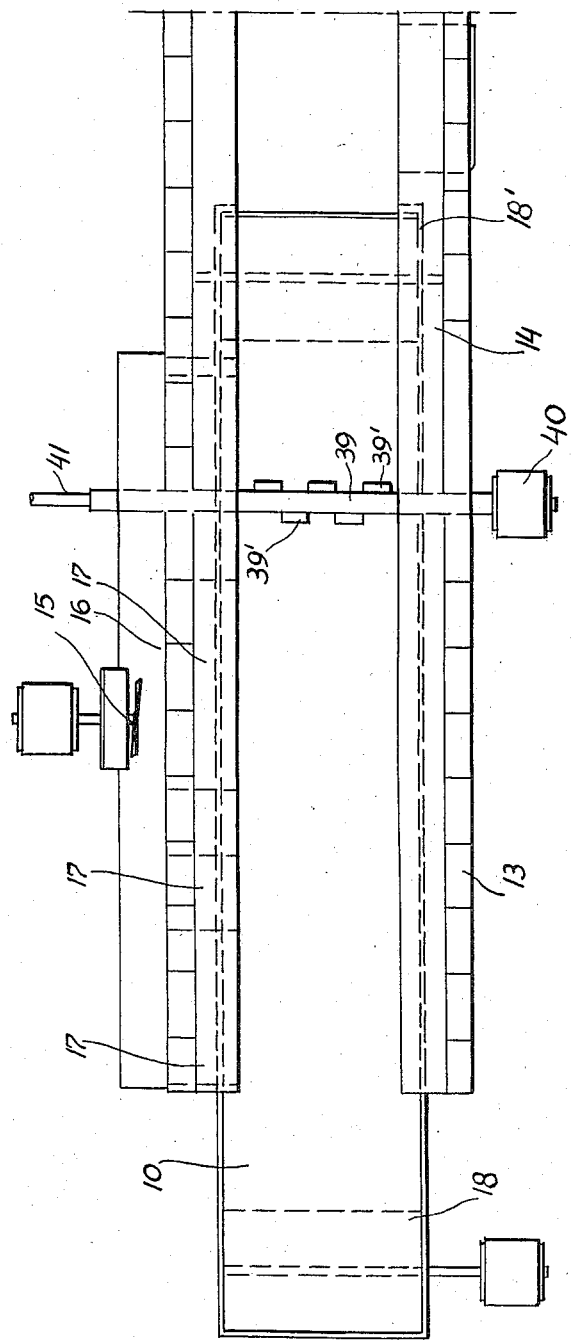

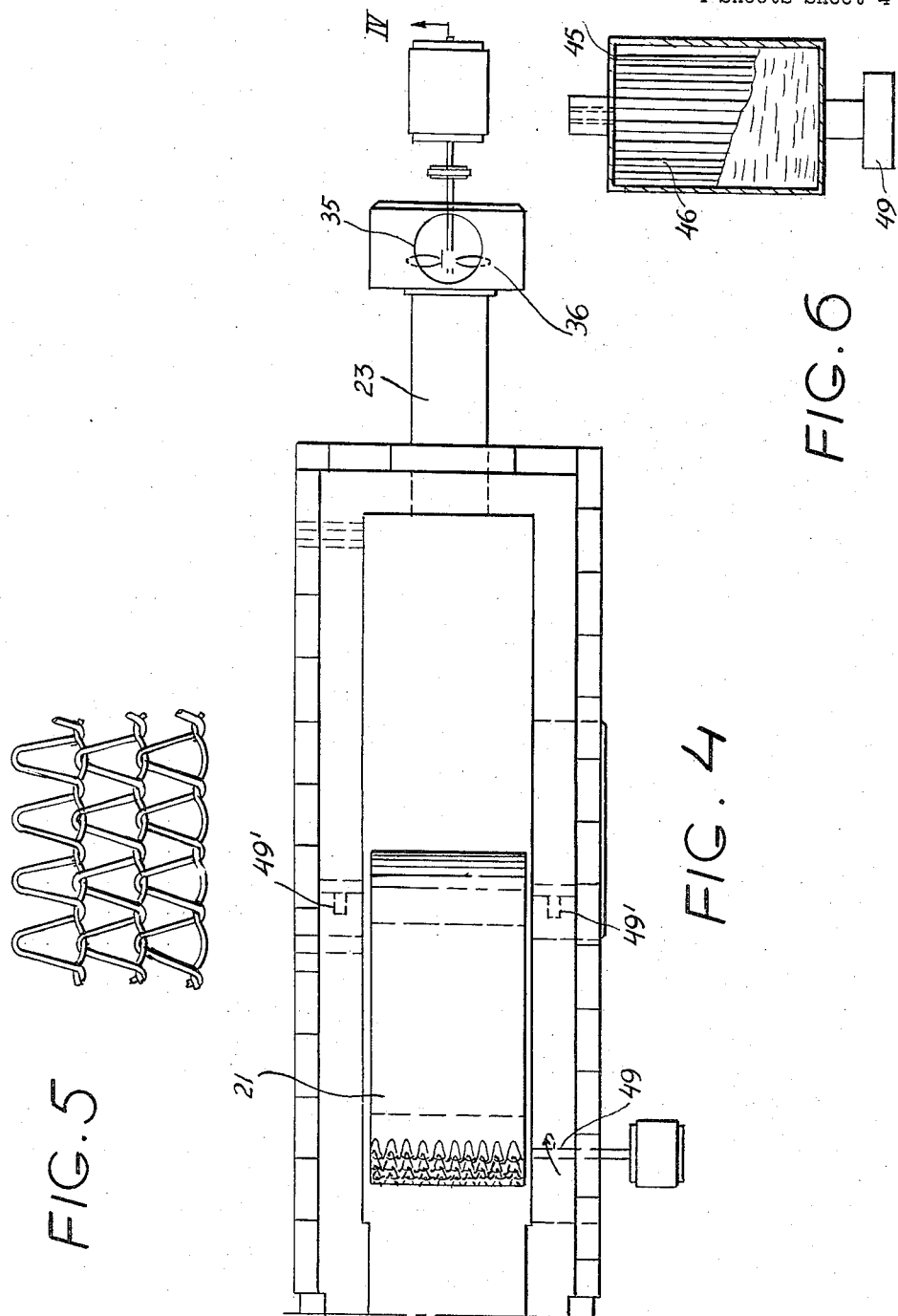

United States Patent Office 2,879,726
Patented Mar. 31, 1959

2,879,726

GARBAGE, TRASH AND SLUDGE DISPOSAL

Frederick Ferriss, Morristown, N.J., and James R. Gainfort, Allentown, Pa.; said Gainfort assignor of 2.5% to Roy Francioni, Scranton, 2.5% to Frank L. Pinola, Kingston, 2.5% to Gene Gasparini, Peckville, and 2.5% to William Brosch, Scranton, Pa.

Application November 4, 1955, Serial No. 544,882

9 Claims. (Cl. 110—7)

This invention relates to methods and apparatus for disposal of garbage, rubbish, sewage sludge and combinations of materials of similar characteristics.

An object of the invention is to dispose of garbage and rubbish in such manner as to effectively and concurrently dispose of sewage sludge without emission of smoke, fumes or noxious gases as well as with the production of minimum residues of unobjectionable nature.

An object is the burning of garbage and rubbish in such manner as to dry and burn sewage sludge without emission into the atmosphere of appreciable smoke, dust, or objectionable gases.

Another object is the burning of garbage and rubbish by methods and by utilization of mechanisms to utilize the heat given off to reduce the sewage sludge to fly ash.

Another object is the disposal of garbage, rubbish, and sewage sludge in a common operation with production of minimum solid residue.

Another object is the elimination of fly ash from rubbish and garbage burning furnaces.

Another object is the disposal of sewage sludge without expensive drying operations or the consumption of expensive supplemental fuels.

A feature of the invention is a combustion chamber for garbage and rubbish so designed and coupled with such appurtenances as to enable the production of sufficient excess heat and to apply the heat to the sewage sludge in a manner as to dry and burn the same without emission of smoke, fumes or objectionable gases or air-borne residues.

A further feature is a heat resistant traveling screen hearth of such shape, construction, and dimensions and having the flames and hot gases or both from the garbage and rubbish combustion chamber so applied thereto as to dry and burn the combustible part of the sewage sludge in a single unitary process.

Another feature is the provision of a feeding arrangement for the sewage sludge which enables its supply to the drying and combustion screen at such rate and point and under such control as to enable its complete combustion.

Another feature is the use of a screen for the purpose of causing the drying and combustion of sewage sludge and dropping the fly ash into a fly ash chamber.

Features of an exemplary embodiment of the invention are a reverberatory hearth for intensifying the heat of the main combustion chamber for the refuse and garbage, an automatic poker or stirrer, ports for the ready removal of incombustible elements of garbage and refuse as well as fly ash and controllable ports for admission of air along the length of the main combustion chamber in a regulatable manner whereby maximum combustion efficiency may be achieved to produce the desired high temperature.

Hitherto garbage and trash have been burned in disposal furnaces without much regard to the heat of combustion. Sewage sludge consists of from 96% to 99% water, the balance is combustible material with a small residue of incombustible materials which are recovered as fly ash in the present process. Sewage sludge is to be distinguished from raw sewage per se which is known to usually consist of around 99.9 percent water. Thus, this method deals with those settled, screened or activated sewage products from which about 90 percent to 98 percent of the water of sewage itself has been removed by known processes.

It has been assumed that raw sewage sludge is incombustible without prior drying or by the utilization of expensive fuels. A basis of the present invention is that ordinary garbage and refuse can be burned with sufficient excess heat production to burn completely the usual amount of sewage sludge produced by the community which creates the garbage and refuse. Disposition of sewage sludge has been attended with many problems. It is obnoxious in odor and dangerous to community health and welfare. Disposition for its fertilizer value has proved unsatisfactory because its value for the purpose is slight and it cannot be given away gratis especially in winter weather. The methods and apparatus of the present invention solve these problems by burning it in a continuous process without the expense of supplemental fuel and with the production of a comparatively insignificant residue. In a word, the incineration of the garbage and trash, which needs must be disposed of in any case, is accomplished in such manner as to also dispose of the sewage sludge, which is a separate problem of modern sanitation in many communities.

In an exemplary equipment for carrying the invention into effect, the garbage and trash is burned on a travelling grate of dimensions rather long compared to its width. Air under forced draft is admitted below the grate in variable amounts along the length thereof. A refractory reverberatory hearth extends over the rearward two-thirds of the grate—more or less. Gaseous products of combustion flow rearwardly past the rearward end of the hearth thus facilitating preliminary drying of the garbage and trash before it enters the zone of active combustion.

The products of combustion pass thence over a fly ash precipitation chamber and through the meshes of a sewage sludge drying and combustion screen. This screen slopes rearwardly and the sludge is fed onto the upper end thereof from where it is carried through the intensely hot gases coming from the incineration of the garbage and trash. In practice the combustion zone of this screen stays at a temperature of 1800° F. or more and sludge is not fed to it until it is thus suitably hot. The slope, mesh, construction and direction and angle of this screen and the fact that all the hot gases pass through it without bypassing, are characteristic features of the invention. The incinerator gases, after passing through the screen downwardly, pass over a precipitating chamber for the finer fly ash constituents and thence are driven under by an induced draft fan to the exhaust stack. The induced draft fan and the forced draft fan are of such capacities and are so driven as to create a negative pressure throughout the entire furnace and its passages. This enables the opening of small observation ports at various points whereby operating conditions may be observed without the emergence of significant amounts of smoke or flame. All statements with respect to operation made herein relate to actual observed conditions of operation of a trial equipment of adequate capacity to dispose of the trash, garbage and sewage sludge of a moderate sized city. A significant observed fact is that under full operation with proper feeding, no visible smoke, fumes or dust were emitted from the stack.

Further disclosure will be by means of the description of an exemplary embodiment in connection with the attached drawings which are partially diagrammatic and are simplified by omission of details of well known nature such as gears, bearings, hinges, details of driving equipment, etc.

In the drawings, Figs. 1 and 2 when placed together with Fig. 2 to the right of Fig. 1 comprise a longitudinal vertical cross-sectional view of essential elements of the illustrative embodiment;

Figs. 3 and 4, taken together, are a longitudinal horizontal sectional view on the line III—IV of Figs. 1 and 2;

Fig. 5 is a view of a portion of the sludge drying and burning hearth which consists of a highly heat resistant chain belt, and Fig. 6 is a plan view of the motor driven rotor member of the sludge feeding pump which is shown at the top of Fig. 2.

The exemplary embodiment herein disclosed is a full sized demonstration equipment capable of burning several tons of garbage and rubbish per hour and constructed to have the garbage and rubbish fed into it by hand; power driven gravity chute or automatic feeding means are contemplated. The material is hand fed by scoops onto the front end of a travelling grate 10 through the feed opening 11 under a metal plate 12. The belt and the spaces wherein combustion occurs are surrounded by a brick enclosure 13, the roof of which, and other parts subjected to great heat, are lined with or composed of fire-brick or heat resistant concrete 14. A forced draft fan 15 supplies air into a chamber 16 from whence it is supplied through air ducts 17, each of which may be wholly or partially closed by upwardly sliding doors. The housing for the fan 15 and the chamber 16 may be of wood, metal or other suitable material. The top of the movable grate 10 moves to the right at an exemplary speed of one to two feet per minute. It is advanced by a motor and gearing driven sprocket wheel 18 over an idler sprocket 18' and guided and supported at its edges by guides commonly used with such structures. Over the grate is a refractory roof 14 and flames and hot gases pass between the elements 19 and 20 under the refractory roof 14 to the rearward portion of the furnace wherein the sludge burning chain hearth 21 is located. Incombustible materials in the garbage and trash fall onto the floor and may be removed through an opening closed by a door 22. A pit into which these materials may fall can be provided. With adequately thorough combustion only larger pieces of metal, glass, etc. remain unburned.

The passage from the main combustion chamber to the exhaust pipe 23 is substantially completely intersected by the sludge burning chain hearth 21 which is an endless chain belt composed of highly heat resistant steel links driven by a driving pulley 25 over an idler pulley 26. The chain hearth may have other constructions and may consist, for example, of a screen of interwoven heavy chrome nickel steel wire. The chain hearth contains a multitude of small openings which, in the typical case, may have dimensions roughly of the order of 7 by 4 mm. Raw sewage sludge is supplied at the upper end of this belt at just about the point it leaves the sprocket or roller 26 at a controllable rate with approximately uniform lateral distribution. The chain hearth, as indicated in Figure 5, has wires and openings of such dimensions that the openings, although individually small, aggregate well over 50 percent of the cross section.

The feeding means will be described hereinafter. With proper operation the sludge spreads down the incline of the chain hearth 21 for a short distance but almost immediately dries and clings to the links until completely dried and burned. This occurs before it reaches the sprocket or pulley 25; the burning being facilitated by the fact that the solids of the sludge are chiefly combustible organic matter. The fly ash falls or is scraped by the edge of the metal baffle plate 27 into the chamber 28 with a certain residue falling into the chambers 30 and 34 whence it may be removed at suitable intervals through cleanout doors 29 and 31. Pits for its reception may be provided in large installations. Because sewage sludge is about 98% water—more or less—and the solids are largely combustible the residue—essentially mineral—is quite insignificant in amount and is easily disposed of. Bending the screen about the pulley 26 promotes removal of the clinging particles therefrom.

The chain hearth 21 also serves to remove fly ash from the gases passing through it. Removal of fly ash from the exhaust of rubbish burning furnaces is desirable. The moving hearth 21 performs this function not only when sludge is being burned but also when no sludge is being burned as in warming up periods or other times when no sludge is supplied.

With proper firing and draft, average garbage and trash, as collected, may be burned to maintain a temperature of 1800° F. in and around the chain hearth 21; it is maintained at a red heat and the burning of the sludge solids immediately upon the chain aids in maintaining a high temperature.

The baffles between chambers 28, 30 and 34 are of firebrick construction. Baffle 32 is supported by a steel pipe 33. These chambers and especially chamber 28 are of sufficient dimension that gases through them have a low velocity to precipitate fly ash. Furthermore, chamber 28 is not in the direct line of passage of flue gases. The gases pass to the outlet pipe 23 and are driven into the stack by a fan 36. The outlet 35, fan 36, and stack are so proportioned that a negative pressure of a few millimeters of mercury are maintained at all points in the furnace. This not only prevents exit of gases at the sludge feed opening to be described, but enables observation of the temperature and processes through any one of a number of peep holes 37 which may be provided at any desired points. These are normally closed by pivoted metal plates but may be of other desired constructions.

The negative pressure within the furnace prevents exit of flames or gases at the peepholes when they are opened.

The exemplary system described is not inconsistent with the use of temperature and air-flow measuring and recording equipments and other auxiliary devices such as preheating devices in chambers 34 or 38 or in the stack pipe for part or all of the air supplied to the furnace.

To facilitate more effective combustion and increase the heat, an automatic poker or stirrer is provided over the rear end of the moving hearth 10. This comprises a shaft 39 which is provided with a suitable number of heavy elongated lugs 39' arranged to stir the residual garbage and trash on the grate when it is about four-fifths through the furnace. The shaft 39 is driven by a suitable motor and gearing 40. The shaft 39 is watercooled because it is in the zone of great heat. A pipe 41 is conventionally indicated as extending into the shaft to supply coolant which emerges in a space between the pipe and the inner wall of the shaft.

A significant feature of the invention is the drying and incineration of a community's sewage sludge by incineration of the garbage and rubbish. Accomplishment of this requires uniform and properly controlled feeding of sludge onto a proper zone of the sludge burning chain hearth 21. To this end a pump and distributing mechanism 41 is provided. Cast member 42 is watercooled and serves to bound a reservoir 43 into which sludge is kept supplied from storage tanks of any kind by any conventional means such as a pump 44. A heavy metallic watercooled cylindrical feed member 45 having flanges 46 rotates in the hemi-cylindrical chamber bounded by the bottom part of member 42 and carries the sludge to the elongated opening 48 in the member 42 whence it falls, with uniform distribution laterally, and at a uniform rate onto the chain belt 21. The speed of feeding may be controlled by a variable speed drive mechanism 49 of any suitable type (illustrated conventionally).

Clogging of the feed mechanism by any usual objects found in sewage sludge is prevented by this equipment. Uniformity of feed and uniformity of distribution of the sludge is important and absence of either of them has been found to be a major obstacle to its effective incineration. Any feed which forms a thick layer or which clogs or permits usually large gobs of sludge to be dropped onto the belt at one spot are objectionable. Furthermore, merely pouring the sludge or allowing it to run into an opening in the top of the furnace is unsuitable as the heat tends to dry it prematurely and clog the opening. A typical rate of sludge supply by the feed mechanism 41 may be five gallons per minute. When first deposited on the chain hearth 21 the sludge may and usually does form a more or less continuous layer but quickly begins to dry and become perforate to facilitate its combustion.

Because the chain hearth 21 expands with heat it may be advisable to furnish the shaft of the idler pulley 26 with an adjustable bearing of any suitable type—conventionally illustrated at 49'—to maintain the belt adequately tight to drive properly. This adjustment may be manual or automatic and the speed of the belt and conditions upon it may be observed through a conveniently located peephole.

In operation, the machinery is set in motion and garbage and trash are supplied on the front end of the hearth 10 and ignited. Feeding and burning are continued for some time until the interior around the sludge drying and incinerating belt 21 is at or above 1800° F. This may be accomplished with the material usually collected by a municipal service without the use of supplemental fuels although the process may be expedited by the injection of a small amount of fuel oil by known means and methods. With exceptionally wet garbage and trash, supplemental fuel may be necessary but average material affords 4000 to 7000 B.t.u. per pound and gives sufficient heat surplus to dry the sludge which will burn of its own accord and yield excess heat when reduced below about 60 to 65% water. After sufficient heat is generated the sludge feeding mechanism is set into operation and the rate of feed and speed of the chain hearth suitably adjusted. With normal operation and average materials the sludge is completely incinerated when one-half to three-quarters down the belt 21 which leaves a working margin. Smoke, fumes and dust are absent from the exhaust stack.

The absence of visible smoke, fumes, and dust from the exhaust stack is in part due to promotion of more effective combustion by the moveable hearth 21. In furnaces for the incineration of products of the kind under discussion the heated gases tend to become stratified on their way to the stack with resultant incomplete oxidation of the dust and/or hydrocarbons contained in the gases. The moving screen 21 tends to break up this stratification and, coadjuvantly with the heating of the screen due to combustion of the hydrocarbonaceous solids of the sludge, effects more complete combustion.

We have, therefore, disclosed a method and means for practicing the same whereby the two major elements of municipal wastes may be disposed of in a single process and whereby the other waste materials may be caused to perform the task of reducing the obnoxious product of municipal sludge beds to a minor quantity of unobjectionable material thereby solving the problem of its disposal with reduction of expense, difficulty and elimination of obnoxious odors and danger to health.

Having disclosed the invention by exemplification, what is claimed is:

1. A dryer and incinerator for raw sewage sludge comprising an exhaust gas path for a furnace, a reticulate endless screen grate extending entirely across the cross section of said path and lying entirely within said path, means for advancing said screen grate while maintaining it across said path as aforesaid, sludge feed means for feeding sludge at a steady and controllable rate onto said grate, means for equally distributing said sludge across the grate transversely to the direction of its motion at the point of application of the sludge, heat resistant means surrounding said grate, an opening in the top of said heat resistant means through which said sludge is fed to said grate and induced draft means for drawing the gases in said exhaust gas path through said screen grate.

2. Means for burning sewage sludge by high temperature combustion products comprising, in combination, means defining an exhaust path for the high temperature products, a reticulate screen belt grate extending across the entire cross section of said path, the entire length of said reticulate screen being located within said path, said grate comprising metallic strands defining and bounding numerous orifices, the total combined area as available for passage of gases exceeding the combined cross sectional area of said means which bounds and defines said orifices as measured in the plane of said screen, said screen being normally incapable of retaining sludge thereon, means for depositing within said path a uniform thin layer of sludge upon said grate about and over said strands, and drive means for driving said screen to move said layer across said exhaust path whereby said sludge adheres to said screen and combusts.

3. A combination according to claim 2 wherein said screen grate slopes downwardly, said screen lying entirely within said path whereby the surface of said screen is heated adjacent the point of application of sludge thereto and the means for depositing the thin layer of sludge thereon includes pumping means for depositing the sludge upon the upper edge of said screen grate in said uniformly thin layer.

4. A combination according to claim 2 having fly ash collecting chamber means below said exhaust path, forced draft means, and induced draft means for maintaining a negative atmospheric pressure throughout said exhaust path, said last-mentioned means including means for forcing the gases of combustion downwardly through said screen.

5. A sub-combination of mechanism for drying and incinerating sewage sludge comprising a furnace, means defining an exit passage for the gaseous products of combustion of said furnace, a reticulate heat resistant metal screen extending across substantially the entire area of said passage, the entire length of said screen being positioned within said exit passage, the combined cross sectional area of the perforations of said screen being in excess of the combined cross sectional area of the solid portions which define and bound said perforations, operable means for continually moving said screen, and means for feeding sewage sludge in a uniform thin layer upon said screen.

6. A sub-combination of mechanism for drying and incinerating sewage sludge comprising a furnace means defining an exist passage for the gaseous products of combustion leading away from said furnace, a reticulate screen having the total cross section of its perforations in excess of the solid portions defining and bounding said perforations, said screen being normally incapable of supporting said sludge, the entire length of said screen being located within said exit passage, means for distributing sewage sludge containing from about 96% to about 98% water upon a side of said screen within said passage, means for driving the screen bearing said sludge to move the sludge across said passage, means for dislodging ash from said screen, and means for returning said screen across said passage for receiving a further distribution of said sludge whereby the gaseous products of combustion continuously and simultaneously heat the entire length of said screen.

7. Means for drying and incinerating sewage sludge comprising a furnace for the incineration of garbage and trash, a flue for conducting away the gaseous products of combustion, a screen endless grate conveyor in the form of a chain belt extending across substantially the entire cross section of said flue and lying entirely within said flue, feed means for depositing a distributed layer of sewage sludge, sludge supply means for said feed means, said chain belt being composed of spaced interwoven strands whereby to form a structure having a large ratio of open area to area blocked by strands, said belt being inclined to the vertical whereby with a given degree of opening between said strands there is an increased interception upon the strands of deposited sludge, and drive means for moving said belt.

8. Means for burning sewage sludge by the high temperature combustion products of garbage and trash comprising, in combination, means defining an exhaust path for the high temperature products, a multiperforate screen belt extending across the entire cross section of said path, the entire length of said screen being positioned within the path defined by said defining means whereby all parts of said belt are kept at the temperature of said products except as cooled by the deposition of sludge thereon, said belt sloping downwardly at a substantial angle, the perforations therein at least equaling in cross section the cross sectional area of the solid portions as measured in the working plane of said belt whereby said belt is normally incapable of retaining said sludge, a sludge receiving zone extending across an upper part of said belt, means for depositing a uniformly thin layer of sludge upon said zone, and means for driving said belt continually in a direction to carry the sludge thus deposited in a downward direction and to present a renewed sludge receiving zone.

9. A sludge incinerator comprising an enclosure, exhaust passages in said enclosure for the products of combustion, an entrance passage for the admission of heated gases, a reticulate screen normally incapable of retaining sludge thereon and positioned entirely within said entrance passage, forced air supply means for simultaneously drawing heated gases downwardly through the entire length of said reticulate screen, said screen being maintained at a temperature corresponding to red heat whereby said sludge adheres to said screen and combusts, means for depositing sludge upon said reticulate screen, drive means for maintaining said screen in motion and means for maintaining said sludge cool until the instant of its deposit upon said reticulate screen.

References Cited in the file of this patent

UNITED STATES PATENTS

| | | |
|---|---|---|
| 619,715 | Bright | Feb. 21, 1899 |
| 1,659,564 | Duncan | Feb. 21, 1928 |
| 1,995,893 | McEver | Mar. 26, 1935 |
| 2,026,366 | Stehli | Dec. 31, 1935 |
| 2,045,115 | Allen | June 23, 1936 |
| 2,047,375 | Leftwich | July 14, 1936 |
| 2,116,573 | Harrington | May 10, 1938 |
| 2,481,504 | Ferro et al. | Sept. 13, 1949 |
| 2,577,000 | Clift | Dec. 4, 1951 |
| 2,752,869 | Keenan | July 3, 1956 |